US011508227B2

(12) United States Patent
Saldin et al.

(10) Patent No.: US 11,508,227 B2
(45) Date of Patent: Nov. 22, 2022

(54) MOBILE DEVICE AS A SECURITY SYSTEM COMPONENT

(71) Applicant: Resolution Products, LLC, St. Paul, MN (US)

(72) Inventors: Paul G. Saldin, Stillwater, MN (US); David J. Mayne, Eagan, MN (US); Brian K. Seemann, Lakeville, MN (US)

(73) Assignee: Resolution Products, LLC, St. Paul, MN (US)

( * ) Notice: Subject to any disclaimer, the term of this patent is extended or adjusted under 35 U.S.C. 154(b) by 0 days.

(21) Appl. No.: 17/038,449

(22) Filed: Sep. 30, 2020

(65) Prior Publication Data

US 2021/0097837 A1    Apr. 1, 2021

Related U.S. Application Data

(60) Provisional application No. 62/908,046, filed on Sep. 30, 2019.

(51) Int. Cl.

| | |
|---|---|
| *G08B 19/00* | (2006.01) |
| *G08B 17/06* | (2006.01) |
| *G08B 13/196* | (2006.01) |
| *G08B 13/16* | (2006.01) |
| *H04W 40/00* | (2009.01) |
| *H04L 45/00* | (2022.01) |
| *H04W 88/06* | (2009.01) |

(52) U.S. Cl.
CPC ........ *G08B 19/005* (2013.01); *G08B 13/1609* (2013.01); *G08B 13/19602* (2013.01); *G08B 17/06* (2013.01); *H04W 40/00* (2013.01); *H04L 45/22* (2013.01); *H04W 88/06* (2013.01)

(58) Field of Classification Search
CPC ........ H04W 40/00; H04W 88/06; H04L 45/22
See application file for complete search history.

(56) References Cited

U.S. PATENT DOCUMENTS

| | | | |
|---|---|---|---|
| 6,624,750 | B1 | 9/2003 | Marman |
| 7,030,752 | B2 | 4/2006 | Tyroler |
| 7,262,690 | B2 | 8/2007 | Heaton |
| 7,449,999 | B2 | 11/2008 | Hevia |
| 7,633,385 | B2 | 12/2009 | Cohn |
| 7,855,635 | B2 | 12/2010 | Cohn |

(Continued)

FOREIGN PATENT DOCUMENTS

| | | |
|---|---|---|
| CN | 101013976 | 8/2007 |
| CN | 101030902 | 9/2007 |

(Continued)

*Primary Examiner* — Jamal Javaid
(74) *Attorney, Agent, or Firm* — Fish & Richardson P.C.

(57) ABSTRACT

In one implementation, a method for using a mobile computing device as a security system component includes receiving, from a mobile device and by a security system gateway, mobile device sensor information associated with sensor data captured by the mobile device at a premises monitored by the security system gateway; identifying, based on the received sensor information, a mobile device sensor information rule; identifying an action to perform in the mobile device sensor information rule; and automatically performing the identified action, by the security system gateway, in response to receiving the sensor information from the mobile device.

20 Claims, 14 Drawing Sheets

(56) References Cited

U.S. PATENT DOCUMENTS

| | | |
|---|---|---|
| 7,956,736 B2 | 6/2011 | Cohn |
| 8,073,931 B2 | 12/2011 | Dawes |
| 8,335,842 B2 | 12/2012 | Raji |
| 8,401,575 B2 | 3/2013 | Fischer |
| 8,456,278 B1 | 6/2013 | Bergman |
| 8,473,619 B2 | 6/2013 | Baum |
| 8,478,844 B2 | 6/2013 | Baum |
| 8,478,871 B2 | 7/2013 | Gutt |
| 8,612,591 B2 | 12/2013 | Dawes |
| 8,638,211 B2 | 1/2014 | Cohn |
| 8,649,386 B2 | 2/2014 | Ansari |
| 8,693,398 B1 * | 4/2014 | Chaganti ............. H04L 67/1034 370/328 |
| 8,970,368 B2 | 3/2015 | Bergman |
| 9,141,276 B2 | 9/2015 | Dawes |
| 9,412,248 B1 | 8/2016 | Cohn et al. |
| 10,178,533 B2 | 1/2019 | Saldin et al. |
| 10,311,359 B2 | 6/2019 | Seemann et al. |
| 10,621,139 B2 | 4/2020 | Hofstaedter |
| 10,878,322 B2 | 12/2020 | Seeman et al. |
| 2002/0077077 A1 | 6/2002 | Rezvani et al. |
| 2004/0204019 A1 | 10/2004 | Addy |
| 2005/0232186 A1 | 10/2005 | Karaoguz et al. |
| 2006/0047836 A1 * | 3/2006 | Rao ...................... H04L 63/0272 709/229 |
| 2006/0072542 A1 | 4/2006 | Sinnreich et al. |
| 2008/0181130 A1 | 7/2008 | Balu |
| 2009/0070681 A1 | 3/2009 | Dawes et al. |
| 2009/0077622 A1 | 3/2009 | Baum et al. |
| 2009/0138547 A1 | 5/2009 | Boudreau |
| 2009/0233602 A1 | 9/2009 | Hughes |
| 2010/0277300 A1 | 11/2010 | Cohn |
| 2010/0304673 A1 | 12/2010 | Yoshizawa |
| 2010/0323665 A1 | 12/2010 | Ibe et al. |
| 2011/0191465 A1 | 8/2011 | Hofstaedter |
| 2012/0036242 A1 | 2/2012 | Wittenburg et al. |
| 2012/0089299 A1 | 4/2012 | Breed et al. |
| 2013/0051395 A1 | 2/2013 | Hansen |
| 2013/0124736 A1 | 5/2013 | Park |
| 2013/0154558 A1 | 6/2013 | Lee |
| 2013/0265158 A1 | 10/2013 | Bergman et al. |
| 2014/0062297 A1 | 3/2014 | Bora |
| 2014/0089143 A1 | 3/2014 | Dione |
| 2014/0115142 A1 | 4/2014 | Peng |
| 2014/0133378 A1 | 5/2014 | Wentink |
| 2014/0156819 A1 | 6/2014 | Cavgalar |
| 2014/0173692 A1 | 6/2014 | Srinivasan |
| 2014/0207707 A1 | 7/2014 | Na |
| 2015/0005024 A1 | 1/2015 | Fudickar |
| 2015/0049189 A1 * | 2/2015 | Yau .................. G08B 13/19697 348/143 |
| 2015/0067816 A1 | 3/2015 | Rados |
| 2015/0098375 A1 | 4/2015 | Ree |
| 2015/0170506 A1 | 6/2015 | Bergman |
| 2015/0178548 A1 | 6/2015 | Abdallah |
| 2016/0100023 A1 | 4/2016 | Kim |
| 2016/0295397 A1 | 10/2016 | Nielson |
| 2016/0323972 A1 | 11/2016 | Bora |
| 2017/0079257 A1 | 3/2017 | Haensgen |
| 2017/0127124 A9 | 5/2017 | Wilson |
| 2017/0127155 A1 | 5/2017 | Zheng |
| 2018/0097830 A1 | 4/2018 | Shibata |
| 2019/0141506 A1 | 5/2019 | Saldin |
| 2020/0344586 A1 | 10/2020 | Saldin |
| 2021/0166134 A1 | 6/2021 | Seeman |

FOREIGN PATENT DOCUMENTS

| | | |
|---|---|---|
| CN | 101052345 | 10/2007 |
| CN | 101321180 | 12/2008 |
| CN | 102308073 | 1/2012 |
| WO | WO 2017/001928 | 1/2017 |
| WO | WO 2020/206453 | 10/2020 |

* cited by examiner

MOBILE DEVICE AS A SECURITY SYSTEM COMPONENT

CROSS-REFERENCE TO RELATED APPLICATIONS

This application claims benefit of the U.S. Provisional Patent Application No. 62/908,046, filed on Sep. 30, 2019 and is incorporated herein by reference.

TECHNICAL FIELD

This specification generally relates to security systems.

BACKGROUND

Security systems have included sensors and other security system components that transmit signals to a security system controller, such as a security control panel and/or gateway device, that processes the signals and determines whether to generate a security alarm, or other security-related notification. Such sensors and other peripheral devices can transmit signals over wired and/or wireless connections with the security system controller. For example, in a wireless security system, distributed sensors can wirelessly communicate when a state of the sensor has changed, such as a reed switch that has changed state due to a door being opened. In addition, wireless sensors may communicate with the control panel on a periodic basis making what is typically called a "supervisory" transmission, for example, to communicate that the sensor is working properly and that its battery is satisfactory. Depending on the state of the control panel (for example, whether in an "armed state" or not), the security system controller can determine whether the state information provided to it by the sensors constitutes an alarm condition, and if so, the controller can be programmed to take the appropriate action, such as sounding a siren, making communications to a remote monitoring system, etc.

SUMMARY

This document is generally directed to security systems in which a general purpose mobile computing device, such as a smartphone, acts as a security system component providing input to a security system controller to assess the state of a premises and to determine whether to take one or more actions (e.g., sounding a siren, generating an alarm). For example, general purpose mobile computing devices have been connected to and used as part of security systems to output security system information to users (e.g., output security system status information) and to provide user interfaces through which users can control security systems (e.g., output user interface through which the security system can be armed/disarmed). However, in such contexts general purpose mobile computing devices have not provided information sensed locally by the mobile computing devices on conditions related to the premises where the security system is located (e.g., home, business, building). Yet, mobile computing devices include a variety of onboard sensors and other components that can be used to readily determine conditions in and around where they are currently located, such as sensors (e.g., temperature sensors, motion sensors, light sensors, accelerometers, tilt sensors, proximity sensors), cameras (e.g., front facing cameras, rear facing cameras), microphones, location detecting components (e.g., GPS units, local wireless signal-based location determination units), wireless signal detection components (e.g., Wi-Fi chipset, BLUETOOTH chipset), and/or other components. This document is generally directed to using information indicating local conditions at or around a premises that is detected/determined by onboard components in a mobile computing device as input to a security system, in addition to and/or instead of premises information provided by security sensors and other security system components.

For instance, when a mobile device is located at a premises, it can transmit sensor information to the security controller at the premises, such as a security gateway. For example, a mobile computing device can transmit audio signals that can be analyzed by the security controller to determine whether a loud noise occurs, such as a window breaking. The security controller can be programmed to generate security alarms and/or other alerts in response to such events occurring, such as transmitting notifications to mobile computing devices associated with the premises that a loud noise was detected, sounding a siren, and/or transmitting alarm conditions. In another example, a mobile computing device can transmit information identifying nearby detected wireless devices (e.g., wireless signals received with at least a minimum threshold signal strength), which can be used by the security system controller to determine whether any foreign/unknown mobile devices are at or near the premises, which may be an indication of an intruder or unknown person at the premises. In another example, a mobile computing device can transmit a video stream from one or more cameras, which can be used by the security system to determine the state/condition of the premises through, for instance, the use of object detection and machine learning algorithms (e.g., detect whether windows and doors are open or closed through optical object recognition). In another example, a mobile computing device can transmit temperature information to a security controller, which may be used to determine whether alerts should be generated indicating, for instance, that a door has been left ajar and/or that HVAC equipment may be malfunctioning. Additional and/or other information detected by onboard components within a mobile computing device can be transmitted and used by a security system to assess conditions at a premises, and/or other use cases are also possible.

Mobile computing devices can act in any of a variety of modes, such as a sensor mode in which they are transmitting information on conditions at or near a premises to a security system controller, an interface mode in which they are providing information on conditions in the premises and/or control features for controlling the security system, a dual sensor-interface mode in which they are simultaneously acting in both the sensor mode and the interface mode, security controller mode in which they act as a security system controller, dual security controller-sensor modes in which they are simultaneously acting as both the security system controller and sensor modes, triple security controller-sensor-interface modes in which they act in all three of the controller, sensor, and interface modes, and/or other modes (or combinations thereof).

Security system controllers can be local at a premises and/or remote from the premises. For example, in some instances, a security system controller can be a device that is located at a premises and with which a mobile computing device can communicate over a local communication network (e.g., Wi-Fi network, BLUETOOTH network). In some instances, the security system controller can be a remote device and/or system, such as a cloud-based computer system with which a mobile computing device communicates over one or more wide area networks (e.g., interne, mobile data network, virtual private network). Other configurations of a security system controller are also possible, such as a combination of a local device and a remote system that collectively provide controller features.

In some instances, the mobile computing device can, itself, perform the operations of a security system controller, which may be performed in addition to the mobile computing device using its onboard components to detect conditions at or around a premises. In such instances, the mobile computing device may also receive information from sensors and other security system components on conditions in or around a premises. For example, a mobile computing device can be used to provide a mobile security system that can be transported with a user and setup, with one or more mobile sensors, to secure a perimeter at a new/temporary location, such as a hotel room and/or other temporary lodging accommodation. For instance, a user staying in a hotel room can place door and window sensors on the doors and windows in a hotel room that wirelessly transmit state information (e.g., open state, close state) to the mobile computing device, which can act as a security system controller for the premises. The mobile computing device can additionally act as a sensor in such a situation, providing information on conditions in the premises using the onboard components of the mobile computing device.

Such features can be provided on mobile computing devices, for example, through downloadable applications that can be installed on the devices (e.g., mobile apps). Such applications may access information from one or more onboard components on the mobile computing devices, as permitted by the device's onboard security and privacy restrictions, which may be approved and/or adjusted by the device's user. Such mobile applications may, in some instances, process some or all information from onboard components before transmission to a security system controller for analysis. In some instances, mobile applications can transmit a stream of information obtained by onboard components of a mobile computing device. Other configurations are also possible.

Systems, methods and techniques are described herein. In one implementation, a method for using a mobile computing device as a security system component includes receiving, from a mobile device and by a security system gateway, mobile device sensor information associated with sensor data captured by the mobile device at a premises monitored by the security system gateway; identifying, based on the received sensor information, a mobile device sensor information rule; identifying an action to perform in the mobile device sensor information rule; and automatically performing the identified action, by the security system gateway, in response to receiving the sensor information from the mobile device.

Such a method can optionally include one or more of the following features. The mobile device sensor information can be the sensor data captured by the mobile device. The mobile device sensor information can include information generated by the mobile device processing the sensor data captured by the mobile device. The method can further include determining, by the security system gateway, that the mobile device is at the premises and wherein the mobile device sensor information rule is identified in response to determining that the mobile device is at the premises. The security system gateway can determine that the mobile device is at the premises based on location information sent by the mobile device along with the mobile device sensor information. The security system gateway can determine that the mobile device is at the premises based on evaluating a signal strength of a signal from the mobile device that includes the mobile device sensor information. The rule can specify that the mobile device is to be located at the premises. The action can include generating an alarm. The mobile device sensor information can include one or more of temperature information, motion detection, camera images, captured video, or captured audio.

In another implementation, method for using a mobile computing device as a security system component includes determining, by a security system gateway, that the security system gateway is not capable of wide area network communication; sending a backup connection request, to a mobile device, for the mobile device to act as a wide area network backup connection for the security system gateway; receiving a response, from the mobile device, to the backup connection request, confirming that the mobile device will act as the wide area network backup connection; creating a message targeted for a remote security system service; sending the message to the mobile device with a forwarding request for the message to be sent to the remote security system service by the mobile device on behalf of the security system gateway; and receiving a confirmation, from the mobile device, that the message has been sent to the remote security system service, by the mobile device, on behalf of the security system gateway.

Such a method can optionally include one or more of the following features. The backup connection request can be sent to the mobile device over a local area network connection. The mobile device can send the message over a wide area network. The method can further include receiving, from the mobile device, a reply message that was sent to the mobile device from the remote security system service, in reply to the message. The reply message can be sent to the mobile device over a wide area network connection. The reply message can be received by the gateway over a local area network connection.

In another implementation, a system includes a mobile device; and one or more local sensors local to a premises; wherein the mobile device is configured as a security system gateway for the premises and wherein the mobile device is configured to: receive information from the one or more local sensors; identify a security system rule based on the received information; identify an action in the identified security system rule; and automatically perform the identified action.

Such a system can optionally include one or more of the following features. The mobile device can be configured to generate sensor information for the premises using one or more mobile device sensors of the mobile device. The mobile device can be configured to identify the security system rule based on the sensor information for the premises generated using the one or more mobile device sensors and the information from the one or more local sensors.

Certain implementations may provide one or more advantages. For example, A mobile device can be used as a sensor for providing information to a security system for evaluation and action. A mobile device can be used as a backup communication connection for a security system. A mobile device can be used as a security system gateway.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE ATTACHMENTS

Like reference numbers and designations in the various drawings indicate like elements.

DETAILED DESCRIPTION

This document describes systems, devices, techniques, and mechanisms for security systems in which a mobile device can be used as a security system component. For instance, a mobile device can be used as a sensor for providing information to a security system, as a backup communication connection for a security system, and/or as a security system gateway.

Figure 1:
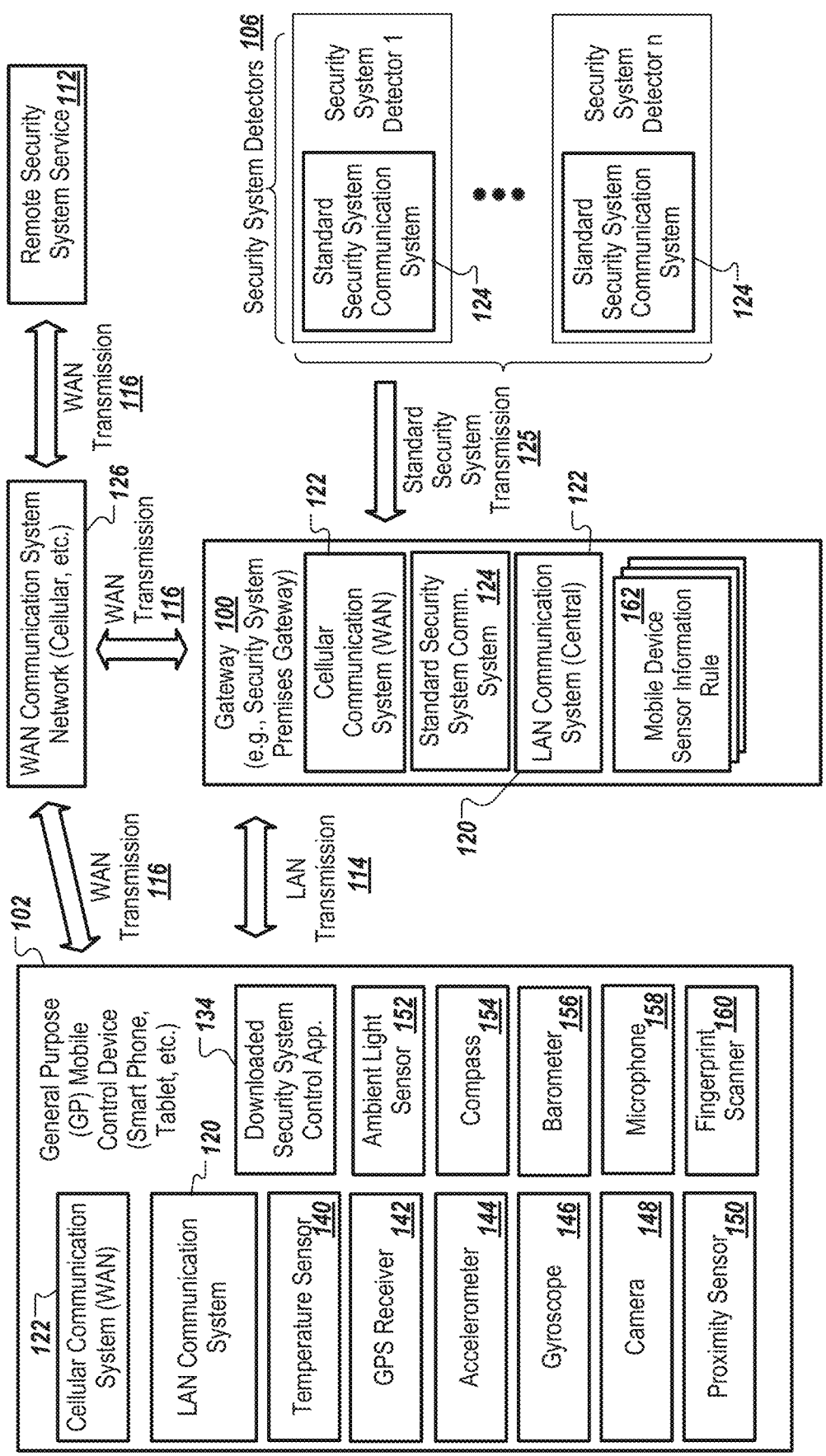
FIG. 1 is a block diagram of an example security system environment.

FIG. 1 is a block diagram showing interactions within an example security system. For example, the security system can include a security system premises gateway (e.g., a gateway 100) and related components. The example gateway 100 can control the security system and can provide an interface for a mobile computing device 102 to access/control the security system. Mobile devices 102 can include, for example, general purpose mobile control devices, including smart phones, tablet computing devices, laptop computers, wearable computing devices, and/or other computing devices that may be mobile. Other types of computing devices can be used as the mobile device 102. The gateway 100 can communicate with other components, including security system detectors 106, a remote security system service 112, and security system control devices (not shown).

Communications among the gateway 100 and related components can include local area network (LAN) communications 114 and wide area network (WAN) communications 116. LAN communications 114 can be used, for example, among components that are situated in the premises of the gateway 100, including the mobile device 102, when present within a threshold distance of the gateway 100 (e.g., in or near the home or other building(s) in which the gateway 100 is located). Components that communicate over the LAN can include LAN communication systems 118 (peripheral role) and 120 (central role), and a cellular communication system 122 (e.g., WAN). Security system-related components can use a standard security system communication system 124 (e.g., using standard security system transmissions 125). WAN communication between the gateway 100 and the mobile device can be handled using a WAN communication system network 126 (e.g., that services cellular phone networks). In some implementations, communication between the gateway 100 and the mobile device 102 can be handled with a downloaded security system control application 134.

The mobile device 102 can include a variety of sensors. The security system control application 134 can obtain sensor information generated or gathered by sensors of the mobile device 102 and provide the sensor information to the gateway 100. The mobile device 102 includes, for example, a temperature sensor 140, a GPS (Global Positioning Satellite) receiver 142, an accelerometer 144, a gyroscope 146, a camera 148, a proximity sensor 150, an ambient light sensor 152, a compass 154, a barometer 156, a microphone 158, and a fingerprint scanner 160. The security system control application 134 can obtain information from these and other sensors and provide sensor information to the gateway 100. In some implementations, the mobile device 102 provides sensor information to the gateway 100 without processing the sensor information. In other examples, the security system control application 134 may analyze sensor information and determine which sensor information (or which analysis information) to provide to the gateway 100 (e.g., based on a set of rules).

The gateway 100 can identify, based on the received sensor information, a mobile device sensor information rule 140 (e.g., from among multiple configured rules). The mobile device sensor information rule 140 can specify an action to perform when certain type(s) (or certain values) of mobile device sensor information is received. The gateway 100 can automatically perform the identified action, in response to receiving the sensor information from the mobile device 102. Actions can include, for example, generating an alert or alarm, automatically arming or disarming the security system, or otherwise configuring the security system.

Figure 2:
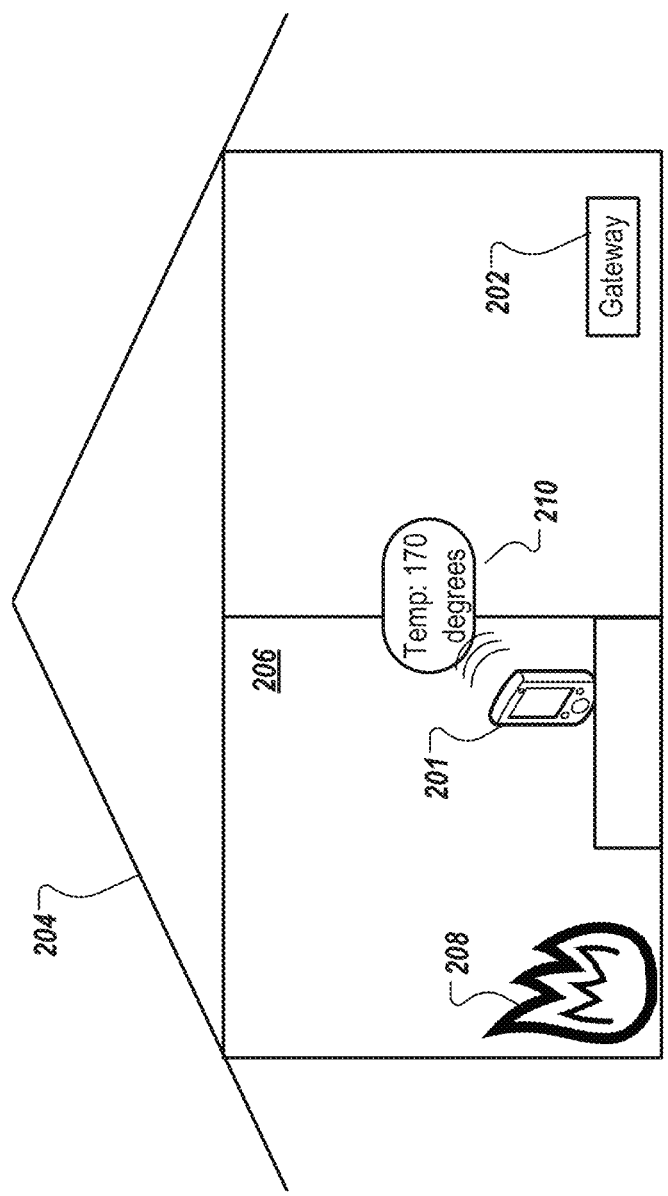
FIGS. 2-7 are conceptual diagrams illustrating examples of using a mobile device as a security system component.

FIG. 2 is a conceptual diagram illustrating an example of using a mobile device as a security system component. A mobile device 201 runs an application that is configured to send temperature readings measured by the mobile device 201 to a security system gateway 202 in a home 204. The application may be configured to send temperature readings periodically (e.g., every minute) or only if a read temperature is more than a predetermined threshold temperature, for example. A user of the mobile device 201 may start the application before going to bed at night, or may leave the mobile device 201 at the home 204 when leaving the home 204, for example.

The mobile device 201 is placed within a room 206. The mobile device has measured a temperature of the room as 170 degrees, e.g., due to a fire 208 that has started in the room 206. The measured temperature of 170 degrees may be more than a threshold temperature of 150 degrees for example. Accordingly, the mobile device 201 can send temperature information 210 to the gateway 202. As another example, in some cases the presence of an intruder may cause an increase in the ambient temperature of the room 206 which can trigger sending of temperature information from the mobile device 201 to the gateway 202.

The gateway 202 can perform one or more actions in response to receiving the temperature information 210. For example, the gateway 202 can automatically generate one or more alerts or alarms, automatically send a message to a mobile device of an owner of the home 204, automatically send a message to emergency responder(s), etc. The gateway 202 may determine to perform an action based on the received temperature information 210 and on other received or determined information. For example, the security system itself may include or be connected to other temperature sensors which have provided temperature information to the gateway 202. As another example, non-standard security devices in the home 204, such as personal computers or other smart appliances may have provided temperature information to the gateway 202.

Figure 3:
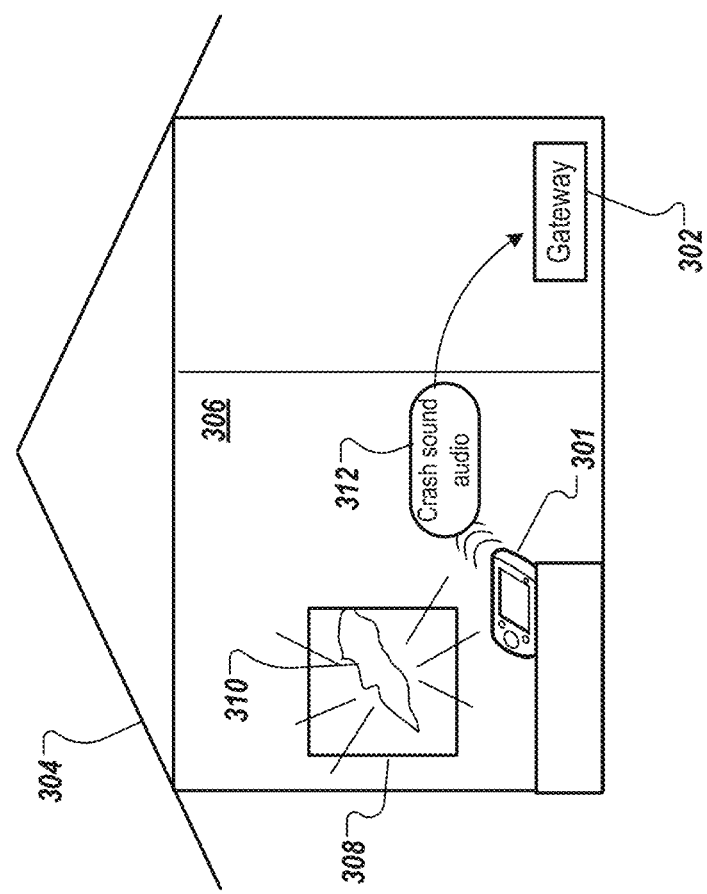

FIG. 3 is a conceptual diagram illustrating another example of using a mobile device as a security system component. A mobile device 301 runs an application that is configured to record audio and send recorded audio (or information about the recorded audio) to a security system gateway 302 in a home 304. The application may be configured to send recorded audio if a detected decibel level is more than a predetermined threshold decibel level, for example. A user of the mobile device 301 may start the application before going to bed at night, or may leave the mobile device 301 at the home 304 when leaving the home 304, for example. The mobile device 301 is placed within a room 306 underneath a window 308. If an intruder attempts to break into the home 304 by breaking the window 308, the application can detect that audio of a window breakage 310 is more than a predefined decibel level, and can send recorded audio 312 (or an indication that detected audio is more than the predefined decibel level) to the gateway 302.

The gateway 302 can be configured to perform one or more actions in response to receiving audio or audio-related information from the mobile device 301. For instance, if the gateway 302 receives an indication that audio more than the threshold decibel level has been detected by the mobile device 301, the gateway 302 can generate one or more alerts or alarms, send a message to a remote security service, send a message to another mobile device of the user (e.g., that may be with the user when the user is not at the home 304), etc. In some implementations, the mobile device 301 application performs analysis of recorded audio and sends information about the analysis to the gateway 302. For instance, the application can determine that recorded audio sufficiently matches a template sound of a window breakage, and the mobile device 301 can send an indication that a window breakage has been detected to the gateway 302. The gateway 302 can automatically perform one or more actions based on a type of received audio-analysis information. For instance, the gateway 302 can generate an on-premise alarm if the gateway 302 receives an indication that a window breakage has been detected.

As another example, the mobile device 301 can send recorded audio to the gateway 302 (e.g., when noise(s) more than a threshold decibel level have been detected), and the gateway 302 can analyze the received audio. The gateway 302 can analyze received audio and determine that the received audio sufficiently matches a template sound of a window breakage. The gateway 302 can automatically perform an action (e.g., generating an alarm) based on determining that received audio matches one of a predetermined set of audio types (e.g., window breakage, gun shot, door slam, human scream or human voices, etc.).

Figure 4:
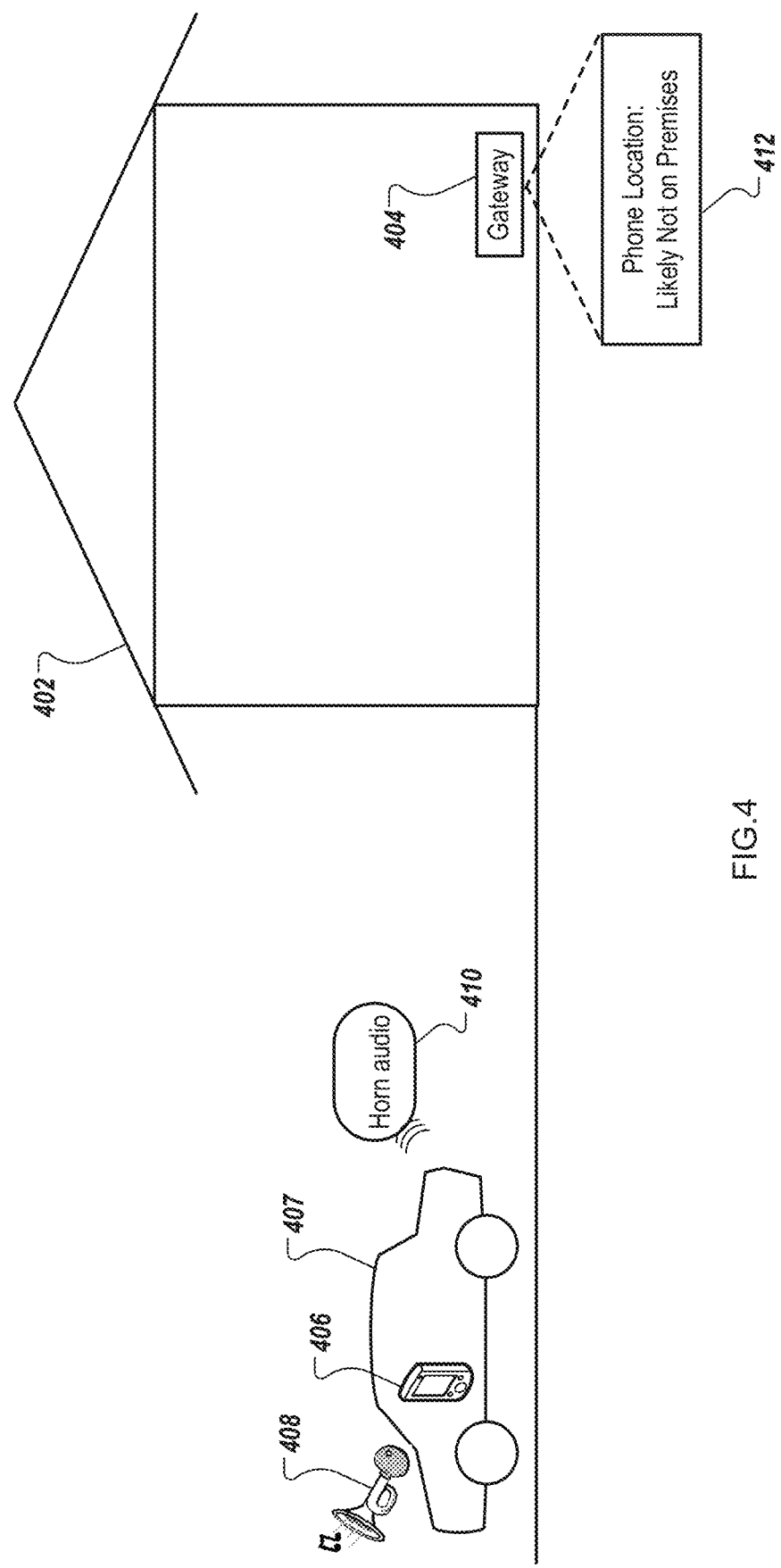

FIG. 4 is a conceptual diagram illustrating another example of using a mobile device as a security system component. A mobile device application can be configured to send information to a security system gateway when the application has determined that a mobile device is at or in proximity to the same premises monitored by the gateway. As another example, the gateway can determine a location of a mobile device, such as by triangulating signals received from the mobile device, and determine whether the mobile device is at or in proximity to the premises. If the mobile device is at or in proximity to the premises, the gateway can consider (and potentially act on) information received from the mobile device. If the mobile device is not at the premises (e.g., as determined by a particularly weak signal from the mobile device), the gateway may discard or downgrade information received from the mobile device. In some implementations, the mobile device sends location information along with other sensor-related information. The gateway can determine, based on the received location information, whether the mobile device is at the premises monitored by the gateway, with the gateway acting accordingly to received mobile device information based on whether the mobile device is present.

For example, an owner of a home 402 that is monitored by a gateway 404 may be leaving the premises, with a mobile device 406, in a car 407. A security application that was running when the user was at the home 402 may still be running on the mobile device 406, recording audio, determining whether recorded audio is greater than a threshold decibel level, or performing other actions. For instance, the mobile device application may detect noise from a car horn 408 and determine that the car horn noise is greater than a predetermined decibel level. The mobile device application, before sending audio to the gateway 404, may determine a location of the mobile device 406. If the mobile device application determines that the mobile device 406 is not at or in proximity to the home 404, the mobile device application may determine to not send recorded audio. The mobile device application may determine to stop security monitoring (e.g., stop the application or put the application in a non-monitoring mode, stop recording audio) based on determining that the mobile device 406 is not at the premises.

In some implementations, if the mobile device application is performing security monitoring, the mobile device application sends sensor-related information to the gateway 402 without checking a location of the mobile device 406. For instance, the mobile device 406 can send car horn audio 410 (or information indicating a car horn sound) to the gateway 404. The gateway 404 can receive the car horn audio 410 (or audio information) and can determine a location of the mobile device 406 (e.g., either by triangulating signal information received from the mobile device 406 or evaluating location information received from the mobile device 406). The gateway 404 can, for example, determine that the mobile device 406 is no longer at or near the home 404, and accordingly ignore the received car horn audio (or audio information). The gateway 404 can store location information 412 for the mobile device 406, and use the stored location information in the future, such as if the gateway 404 can't determine a subsequent location of the mobile device 406 to pair with other information received from the mobile device 406.

Figure 5:
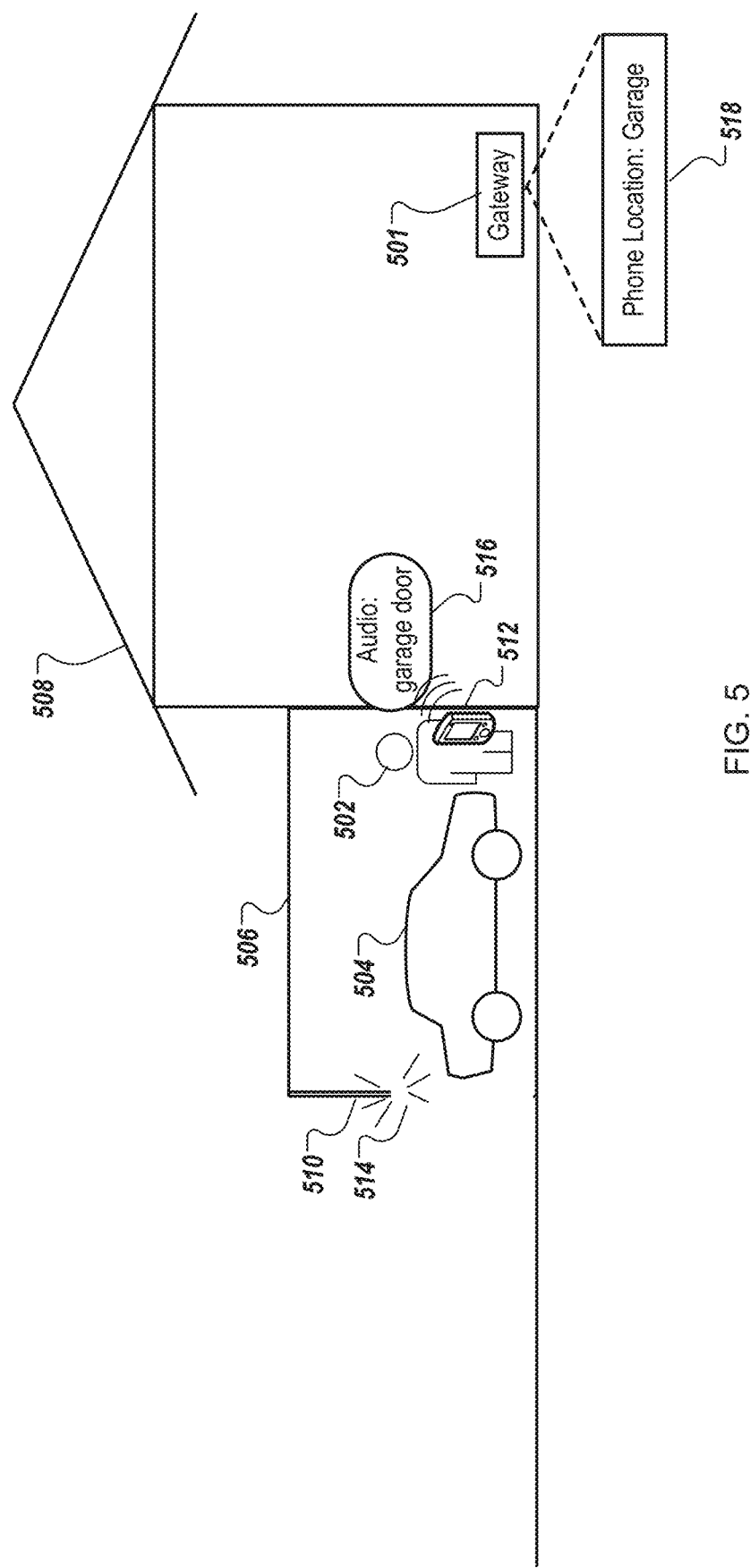

FIG. 5 is a conceptual diagram illustrating another example of using a mobile device as a security system component. In some implementations, a mobile device and/or a gateway 501 can be configured to ignore or downgrade information received from certain locations within a monitored premises. Or, as another example, the mobile device and/or the gateway 501 can be configured to ignore or downgrade information received from certain locations within a monitored premises when other conditions are present, such as an owner being home or a current time being in preconfigured time windows. As yet another example, the mobile device and/or gateway 501 can be configured to ignore or discard certain types of detected signals.

For instance, a user 502 has just parked a car 504 in a garage 506 at a home 508, and is shutting a garage door 510 of the garage 506. A security application running on a mobile device 512 of the user 502 can detect and record a garage-door-closing noise 514. In some implementations, the mobile device 502 sends garage-door-closing audio 516 to the gateway 501, for evaluation by the gateway 501. In other example, the mobile device application performs processing before sending (or deciding whether to send) the garage-door-closing audio 516.

The mobile device application and/or the gateway 501 can be configured to ignore certain types of audio, or, in some examples, certain types of audio occurring at certain times, or certain types of audio occurring at certain times when the user 502 is at the home 508. For instance, the mobile device application and/or the gateway 501 can be configured to ignore garage-door closing audio when the user 502 is home, or ignore garage-door-closing audio when the user 502 is home and a current time is outside of the hours of 12:00 am to 6:00 am. As yet another example, the mobile device application and/or the gateway 501 can be configured to ignore garage-door-closing audio when the mobile device 512 is located within the garage 506 (e.g., either the mobile device application or the gateway 501 can determine a location of the mobile device 512 within or near the home 508). The gateway 501 can determine and maintain location information 516 for the mobile device 502, for example.

Figure 6:
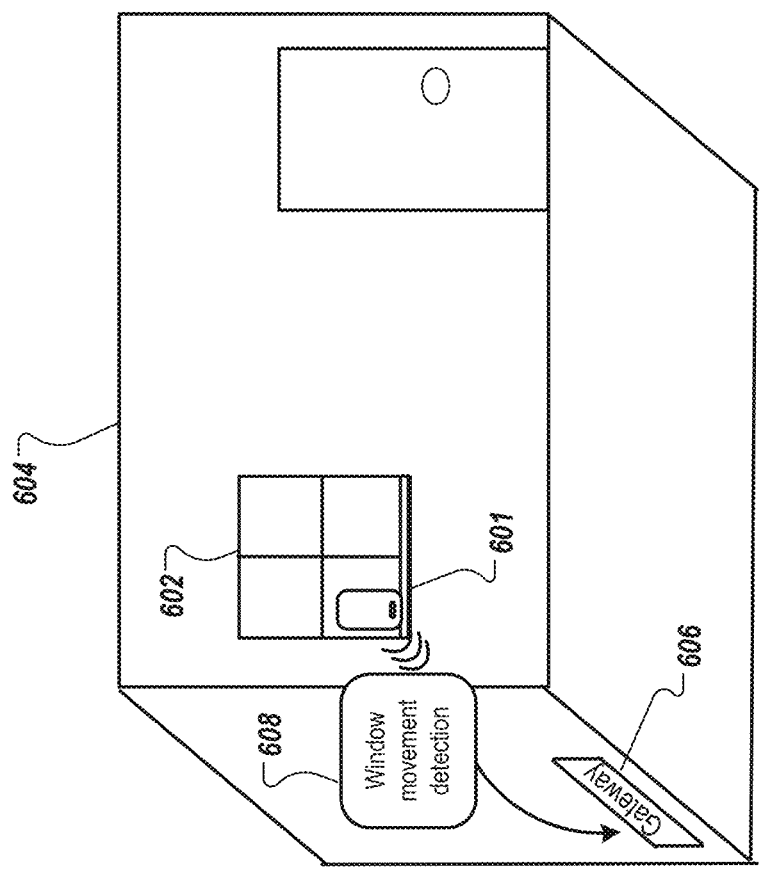

FIG. 6 is a conceptual diagram illustrating another example of using a mobile device as a security system component. A user of a security system places a mobile device 601 in a window 602 (e.g., on the inside of the window glass) of a home 604, and establishes a connection between the mobile device 601 and a gateway 606 that is located within the home 604. The user may place the mobile device 601 in the window 602 to detect movement of the window 602 (e.g., when the user is away from the home 604, at home sleeping, etc.). The mobile device 601 can be configured to run an application that uses a gyroscope and/or an accelerometer of the mobile device 601 to detect movement (e.g., opening, breakage) of the window 602. The mobile device 601 may be fastened to the window 602, e.g., by using fasteners or by being placed in a cradle, so that if the window 602 is opened (or the glass around the mobile device 601 is broken), the mobile device 601 will move and the application will detect the movement. The application can be configured to send a movement detection notification 608 to the gateway 606, upon detection of movement of the mobile device 601.

The gateway 606 can perform one or more actions upon receiving an indication of motion detection. For instance, the gateway 606 can send a notification to the user (e.g., to another mobile device that is with the user), send a message to a remote security system service, generate an on-premises alarm, or perform some other action.

Figure 7:
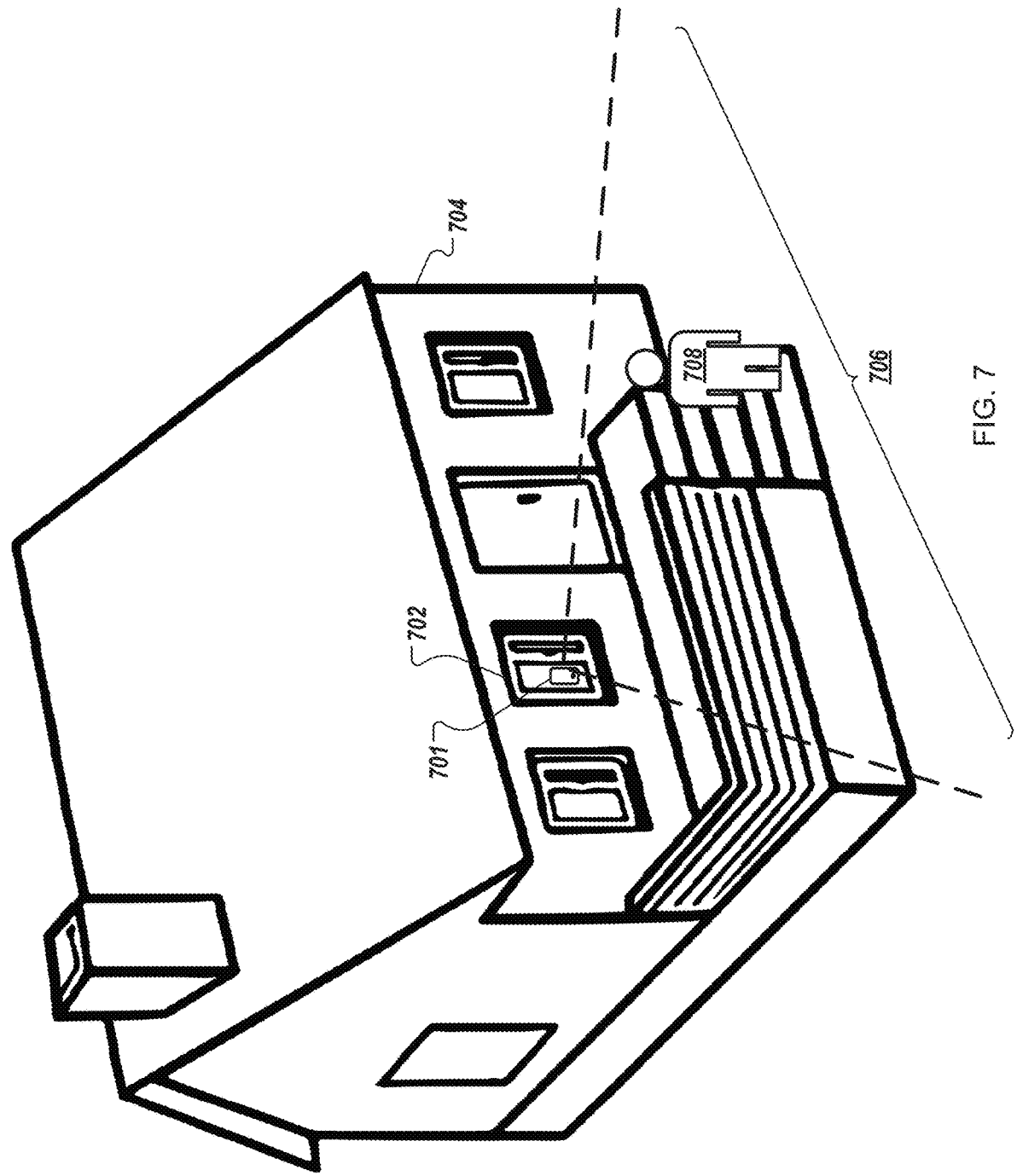

FIG. 7 is a conceptual diagram illustrating another example of using a mobile device as a security system component. A user of a security system places a mobile device 701 in a window 702 (e.g., on the inside of the glass) of a home 704, and establishes a connection between the mobile device 701 and a gateway that is located within the home 704. The user may place the mobile device 701 in the window 702 to detect movement outside the home 704 when the user is away from the home 704. The mobile device 701 can be configured to run an application that captures video in a field of view 706 of a camera of the mobile device 701. The application can be configured to detect motion (e.g., a change in captured video frames) and send a notification to the gateway when motion is detected. For instance, a person 708 approaching the home 704 while the user is away can be detected by the application on the mobile device 701 and the mobile device 701 can send an indication of detected movement to the gateway.

The gateway can perform one or more actions upon receiving an indication of motion detection. For instance, the gateway can send a notification to the user (e.g., to another mobile device that is with the user), send a message to a remote security system service, generate an alarm, or perform some other action. In some implementations, the mobile device sends captured video to the gateway and the gateway sends the captured video to the remote security service, to enable the user to view the captured video. The captured video can include a predefined number of seconds of video before motion detection and after motion detection ends, for example.

Figure 8:
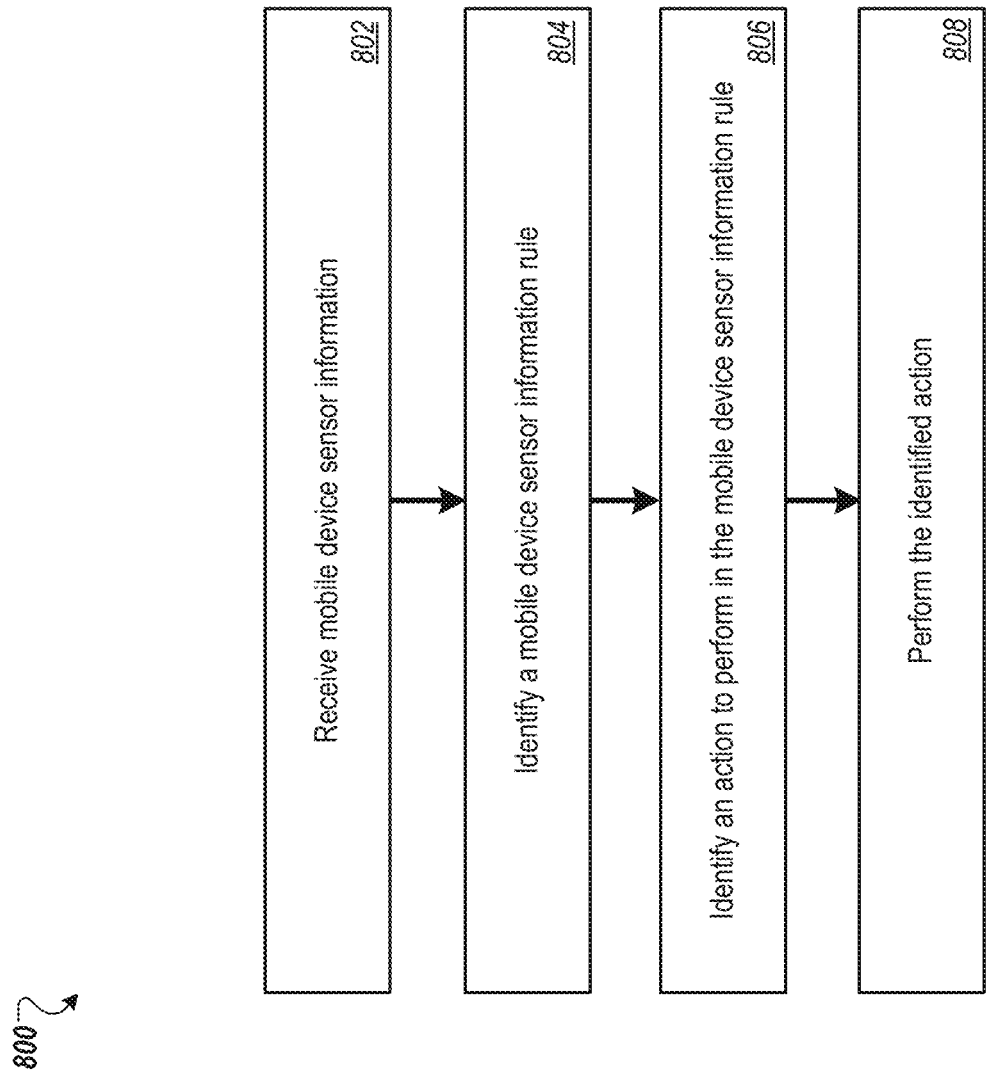
FIG. 8 depicts a flowchart of an example technique for using a mobile device as a security system component.

FIG. 8 depicts a flowchart of an example technique 800 for using a mobile device as a security system component.

At 802, a security system gateway receives, from a mobile device, mobile device sensor information associated with sensor data captured by the mobile device at a premises monitored by the security system gateway.

At 804, a mobile device sensor information rule is identified, based on the received sensor information.

At 806, an action to perform in response to the received mobile device sensor information is identified, in the mobile device sensor information rule.

At 808, the security system gateway automatically performs the identified action, in response to receiving the sensor information from the mobile device.

Figure 9:
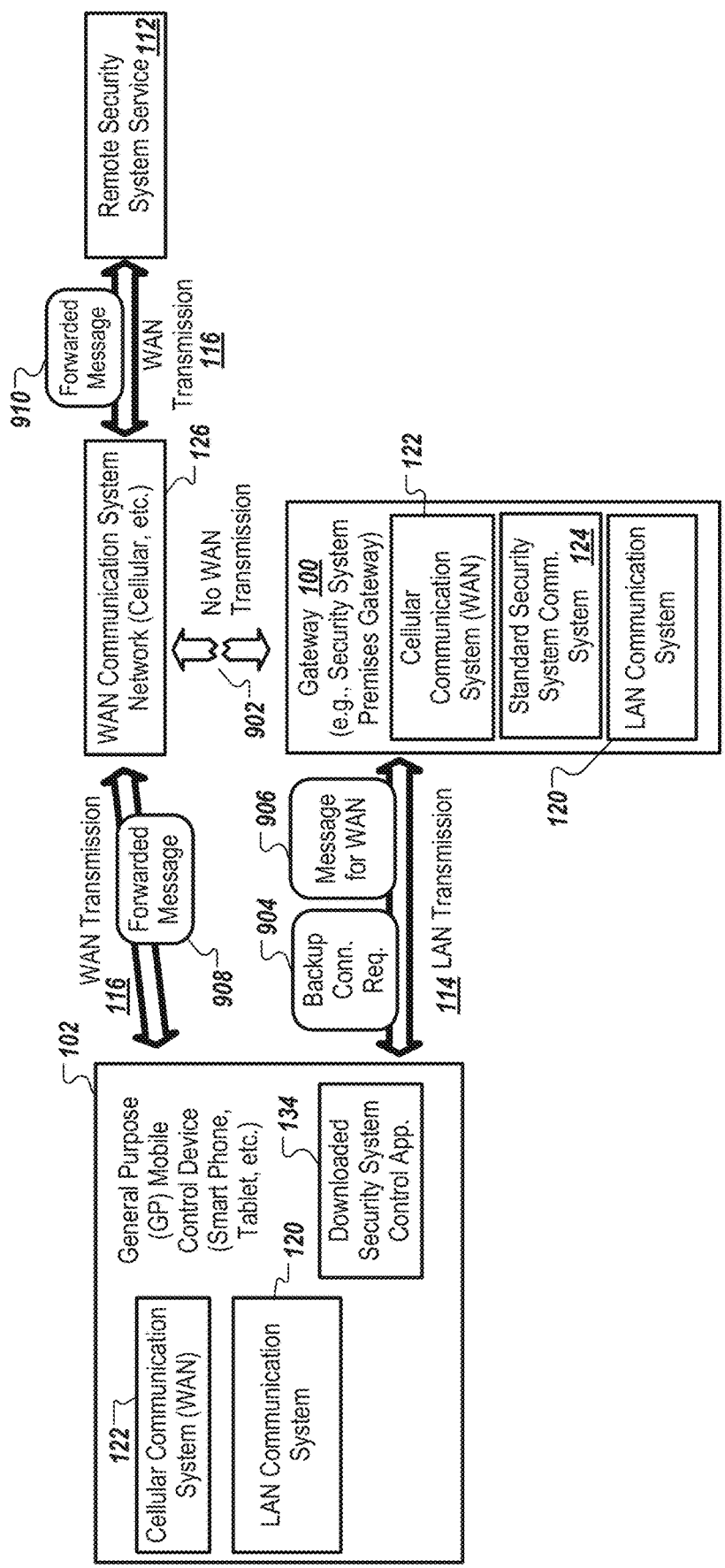
FIG. 9 is a block diagram of an example security system environment.

FIG. 9 is a block diagram of an example security system environment. The gateway 100 can determine that WAN transmission 116 with the WAN communication system network 126 is not possible, e.g., as illustrated by a broken communication link 902. The gateway 100 may have attempted WAN communication, without success, or may have detected a condition whereby the gateway 100 is otherwise aware that WAN communications by the gateway 100 are not currently possible. For instance, the cellular communication system 122 may be malfunctioning or inoperative.

After determining that WAN communication by the gateway 100 is not currently possible, the gateway 100 can send a backup connection request 904, to the mobile device 102, for the mobile device 102 to act as a WAN backup connection for the gateway 100. The backup connection request 904 can be sent as a LAN transmission 114, using the LAN communication system 120, for example. The mobile device 102 can send a response to the backup connection request 904 to the gateway 100 (e.g., confirming that the mobile device 102 can act as a WAN backup connection for the gateway 100).

The gateway 100, when needing to send a WAN message (e.g., targeted to the remote security system service 112), can send a message 906 to the mobile device 102, e.g., with a forwarding request for the message 906 to be sent to the remote security system service 112 by the mobile device 102 on behalf of the gateway 100. The mobile device 102 can send a forwarded message 908, as a WAN transmission 116, over the WAN communication system network 126, to the remote security system service 112. The remote security system service 112 can receive a forwarded message 910, over the WAN communication system network 126. The mobile device 102 can send a confirmation message, to the gateway 100, indicating that that the message 906 has been sent to the remote security system service 112, by the mobile device 102, on behalf of the gateway 100.

Figure 10:
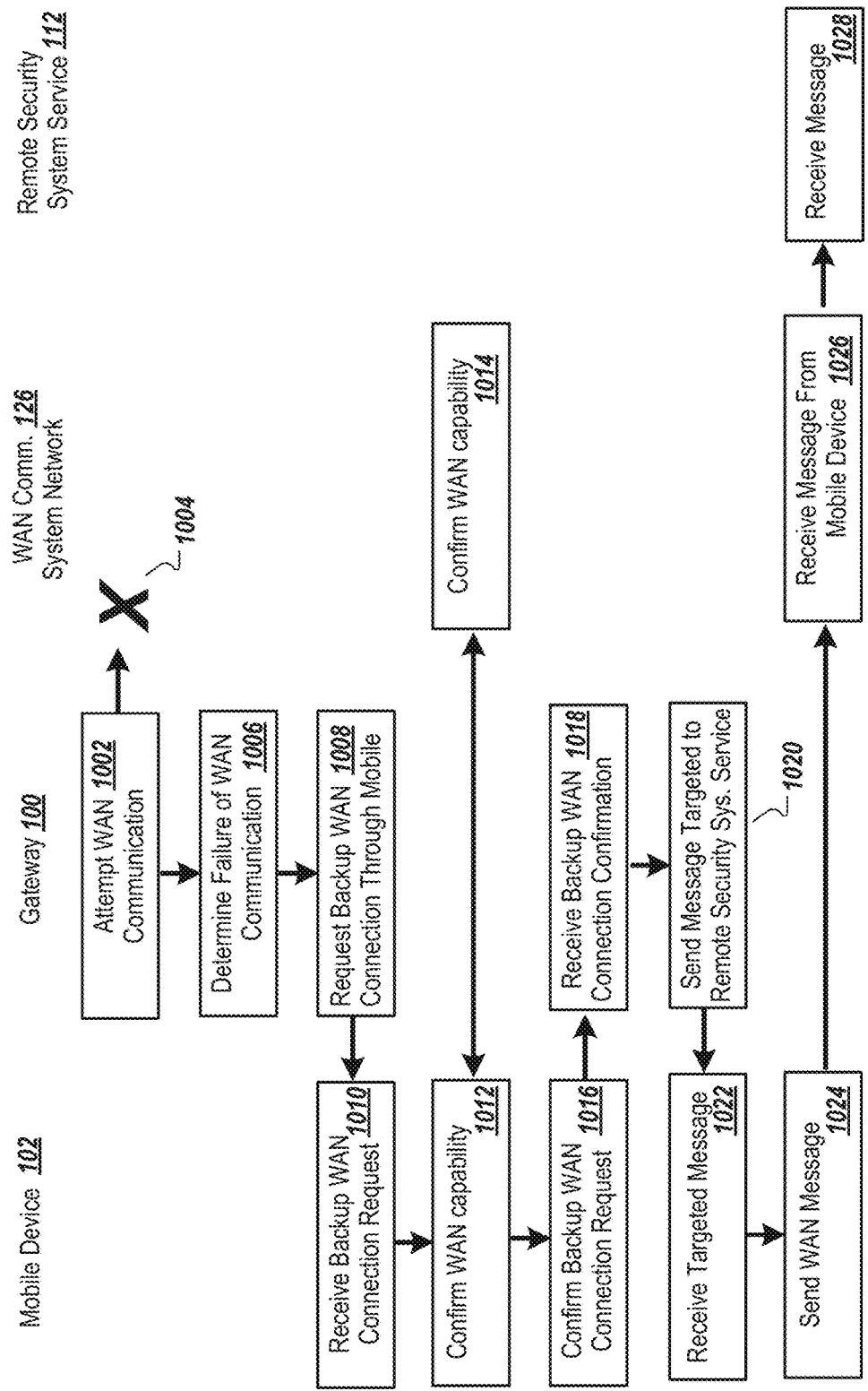
FIG. 10 depicts a flowchart of an example technique for using a mobile device as a backup communication connection for a security system.

FIG. 10 depicts a flowchart of an example technique 1000 for using a mobile device as a backup communication connection for a security system. At 1002, the gateway 100 attempts WAN communication over the WAN communication systems network 126 (e.g., the gateway 100 may attempt WAN communication with the remote security system service 112 or with another system or service). The attempted communication fails, as indicated by a no-communications symbol 1004. As another example, the gateway 100 can otherwise determine that communication over the WAN communication system network 126 may fail or is otherwise not possible. For instance, at 1006, the gateway 100 determines a failure of the attempted WAN communication.

At 1008, in response to determining that WAN communication by the gateway 100 is not possible, the gateway 100 sends a backup WAN connection request to the mobile device 102, e.g., over a LAN connection, for the mobile device 102 to act as a backup WAN communication system/connection that the gateway 100 can use to access the WAN communication system network 126. At 1010, the mobile device 102 receives the backup WAN connection request.

At 1012, the mobile device 102 confirms an ability to perform WAN communications on the WAN communication system network 126. For instance, at 1014, the WAN communication system network 126 and the mobile device 102 may perform a communication handshake to verify an ability for the mobile device 102 to send WAN communications.

At 1016, the mobile device 102 sends a confirmation message to the gateway 100 confirming the backup WAN connection request (e.g., confirming that the mobile device 102 can act as a backup communication system for the gateway 100). At 1018, the gateway 100 receives the confirmation message from the mobile device 102.

At 1020, the gateway 100 generates a message targeted to the remote security system service 112 and forwards the targeted message to the mobile device 102, as a request for the mobile device 102 to send the targeted message to the remote security system service as a WAN message, on behalf of the gateway 100. At 1022, the mobile device 102 receives the targeted message. At 1024, the mobile device 102 sends the targeted message over the WAN communication system network 126, targeted for the remote security system service 112. At 1026, the WAN communication system network 126 receives the targeted message from the mobile device 102. At 1028, the message is provided, over the WAN communication system network 126, to the remote security system service 112. Although not shown, the remote security system service 112 can send a reply message, over the WAN communication system network 126, to the mobile device 102, and the mobile device 102 can forward the reply message, over a LAN connection, to the gateway 100.

Figure 11:
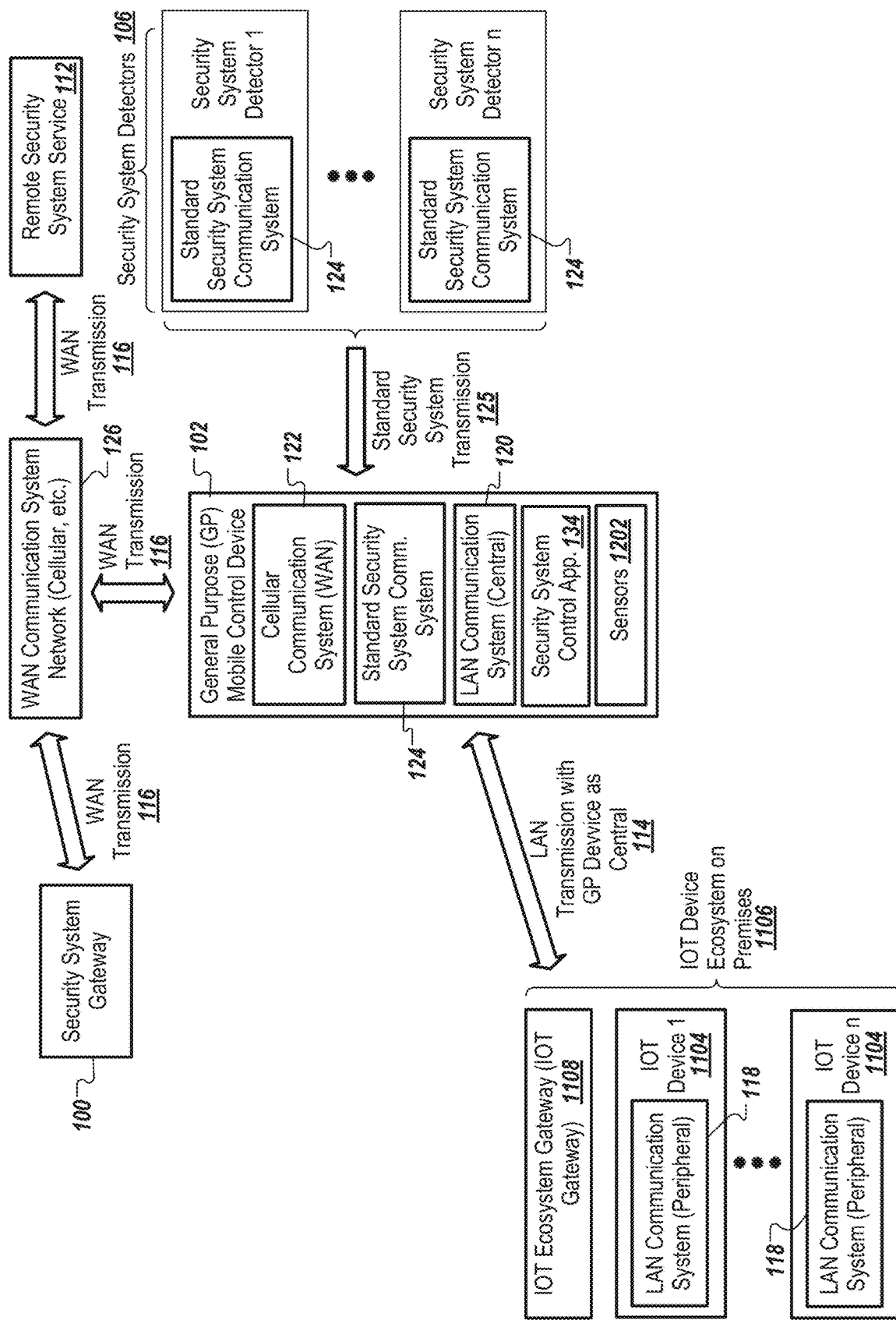
FIG. 11 is a block diagram of an example security system environment.

FIG. 11 is a block diagram of an example security system environment. The mobile device 102 can be used as security system gateway, for example, when a user is at a remote location other than a location monitored by the gateway 100. The security system control application 134 (or another application) can perform security monitoring at the remote location, using information obtained by sensors 1102 of the mobile device 102, and information obtained from other devices at the remote location, such as security system detectors 106 and/or IoT (Internet of Things) devices 1104.

IoT devices 1104 can include components in the remote location that may or may not be security system-related, such as temperature sensors and controls (including heating and air conditioning), doors, locks, garage doors, appliances, lights, and other systems. In some implementations, the IoT devices 1104 can be part of an IoT device ecosystem 1106 at the remote location. In some implementations, the IoT devices 1104 can be controlled and/or interfaced with an IoT ecosystem gateway 1108.

The mobile device 102 can analyze generated and received information, identify rules that match the generated and/or received information, including identifying one or more actions, and automatically perform the one or more actions. For instance, the mobile device 102 can emit an alarm noise at the remote location, or send a message to actuate an alarm device external to the mobile device 102 that is at the remote location. In some examples, the mobile device 102 can communicate with the remote security system service 112 when performing an action (e.g., to request that the remote security system service 112 contact first responders). As another example, the mobile device 102 can send a message to the gateway 100 requesting that the gateway 100 perform an action. For instance, the mobile device 102 can request that the gateway 100 contact the remote security system service 112, e.g., as a redundant request or if the mobile device 102 has detected a failed attempt at communication with the remote security system service 112. As another example, the mobile device 102 may be monitoring an adjacent location to a location monitored by the gateway 100, and the mobile device 102 can send a message to the gateway 100 for the gateway 100 to generate an alarm at the location monitored by the gateway. For instance, the gateway 100 may be monitoring a home and the mobile device 102 may be monitoring an outdoor shed or barn.

Figure 12:
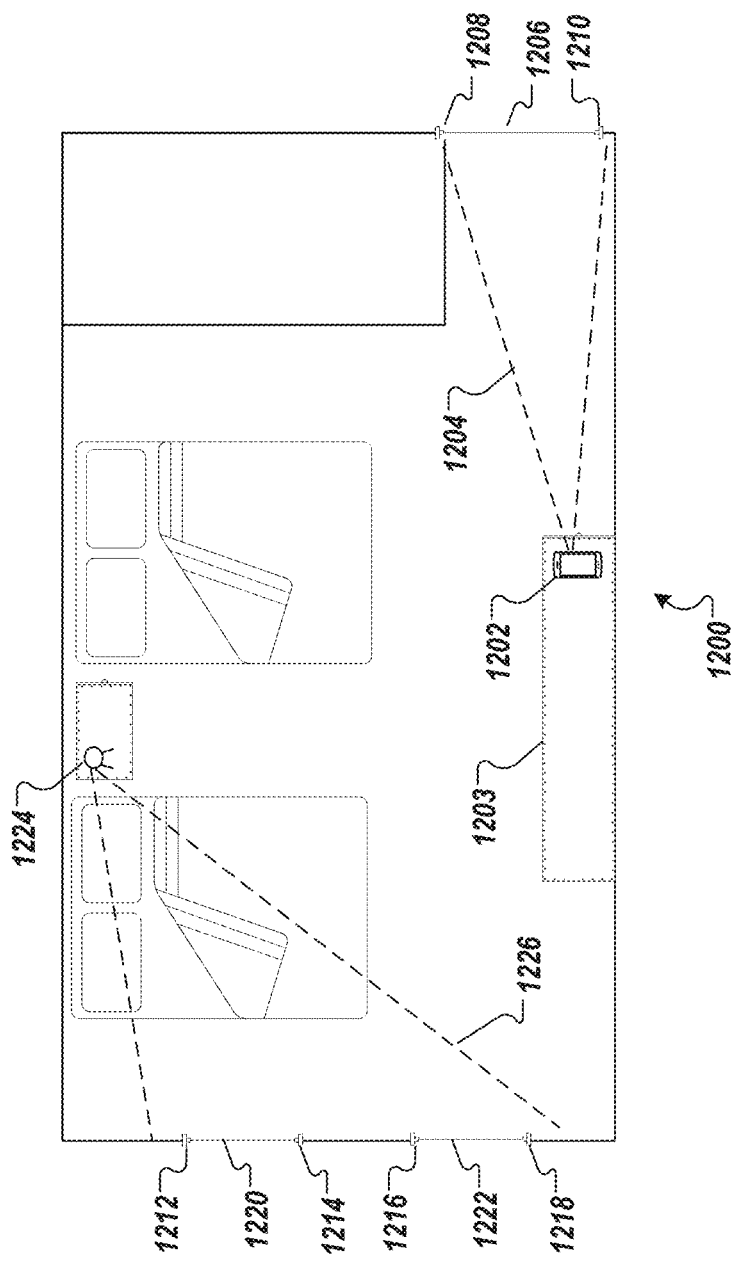
FIG. 12 is a conceptual diagram illustrating using a mobile device as a security system gateway.

FIG. 12 is a conceptual diagram illustrating using a mobile device as a security system gateway. A user staying in a room 1200 (e.g., a hotel room or another temporary dwelling) uses a mobile device 1202 as a security system gateway. For example, the mobile device 1202 can communicate with other devices in the room 1200, to implement a security system that secures the room 1200. The mobile device 1202 can use information gathered by the mobile device 1202, and information gathered or obtained by other devices in the room 1200, to implement the security system.

For instance, the mobile device 1202 can be placed on a dresser 1203 in the room 1200 so that a camera of the mobile device 1202 has a field of view 1204 that includes a door 1206. The user can place the mobile device 1202 on the dresser 1203 when going to sleep and/or can place the mobile device 1202 on the dresser 1203 when leaving the room 1200, for example. An application running on the mobile device 1202 can detect motion within the field of view 1204, for example. The mobile device 1202 can perform one or more actions in response to detected motion, such as generating an audio alarm on the mobile device 1202 or on another connected device, or sending a message to one or more devices or systems (e.g., to another device of the user, to a hotel front desk, to police, to a remote security system service, etc.). In some implementations, the mobile device application sends a message to a security system gateway installed in a regular (e.g., permanent) home of the user, requesting that the security system gateway perform one or more actions. For instance, the mobile device 1202 can send a message to an in-home security system gateway requesting that the security system gateway send a message to a remote security system monitoring service.

In addition to using information obtained by the mobile device 1202, the mobile device 1202 can process information received from other devices in the room 1200. For instance, switch sensors 1208 and 1210 have been placed on the door 1206 to detect opening of the door 1206. The switch sensors 1208 and 1210 can send a message to the mobile device 1202 when opening of the door 1206 is detected. In response to receiving a message regarding opening of the door 1206, the mobile device 1202 can automatically perform one or more actions, as described above. As a similar example, switch sensors 1212 and 1214 and switch sensors 1216 and 1218, have been placed on windows 1220 and 1222, respectively. Any of the switch sensors 1212, 1214, 1216, or 1218 can send a message regarding opening of a respective window 1220 or 1222, to the mobile device 1202. In response to receiving a message regarding opening of the window 1220 or the window 1222, the mobile device 1202 can automatically perform one or more actions, as described above.

As another example, a camera 1224 can detect motion within a field of view 1226, with the field of view 1226 including the window 1220 and the window 1222. The user can use the camera 1224 to detect motion within the field of view 1226, since the camera of the mobile device 1202 may not be able to capture both the door 1206 and the windows 1220 and 1222. Other than the camera 1224, the user can use a second mobile device (not shown) to detect motion from opening of the windows 1220 and 1222. The camera 1224 (or the second mobile device) can send captured video (or an indication of detected motion) to the mobile device 1202. The mobile device 1202 can automatically perform one or more actions, in response to determining, from information received from the camera 1224 (or the second mobile device), that motion has been detected by the window 1220 or the window 1222.

If a second mobile device is used, the mobile device 1202 can be configured as a master mobile device and the second mobile device can be configured as an auxiliary (e.g., secondary) mobile device, for example. The mobile device 1202 and the second mobile device can run a same or different security application, for example. If running a same security application, the mobile device 1202 can run in a master mode and the second mobile device can run in an auxiliary mode.

As yet another example, the mobile device application running on the mobile device 1202 can detect when the mobile device 1202 is moved (e.g., picked up by an intruder or an unauthorized/unexpected person other than the user). For instance, the mobile device application can detect when information from a gyroscope and/or an accelerometer of the mobile device 1202 indicates movement of the mobile device 1202. In response to detecting unauthorized or unexpected movement of the mobile device 1202, the mobile device application can automatically perform one or more actions, such as generating an alarm or sending a message to one or more devices or systems. The user can unlock the mobile device 1202 without generation of an alarm by entering in a code without moving the mobile device 1202 while the mobile device 1202 is in a cradle, for example.

In addition to devices and sensors shown, the mobile device 1202 can receive and act on information from other devices or systems. For example, other devices in the room 1200 can record audio, temperature, barometric pressure, smoke levels, or other information, and provide recorded information to the mobile device 1202. The mobile device application can process received information, evaluate one or more rules based on type(s) of received information, and automatically perform one or more actions that are specified in or associated with the evaluated rule(s).

Figure 13:
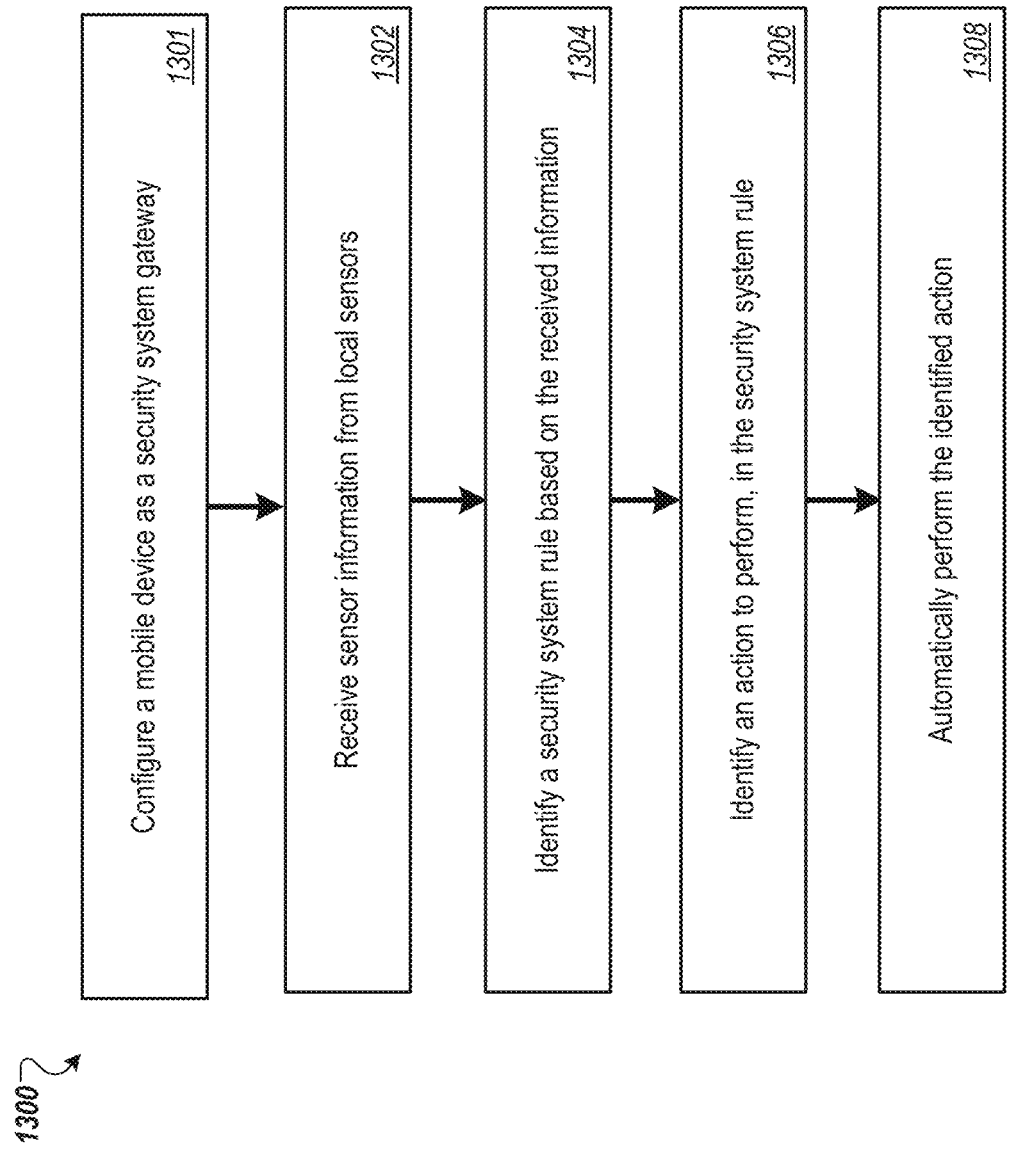
FIG. 13 depicts a flowchart of an example technique for using a mobile device as a security system gateway.

FIG. 13 depicts a flowchart of an example technique 1300 for using a mobile device as a security system gateway. At 1302, a mobile device is configured as a security system gateway for a premises.

At 1304, the mobile device receives information from the one or more local sensors that are located at the premises.

At 1306, the mobile device identifies a security system rule based on the received information. In some implementations, the mobile device generates mobile device sensor information from one or more sensors and uses the generated sensor information (perhaps along with the received information from the local sensors) to identify the security system rule.

At 1308, the mobile device identifies an action in the identified security system rule.

At 1310, the mobile device automatically performs the identified action.

Figure 14:
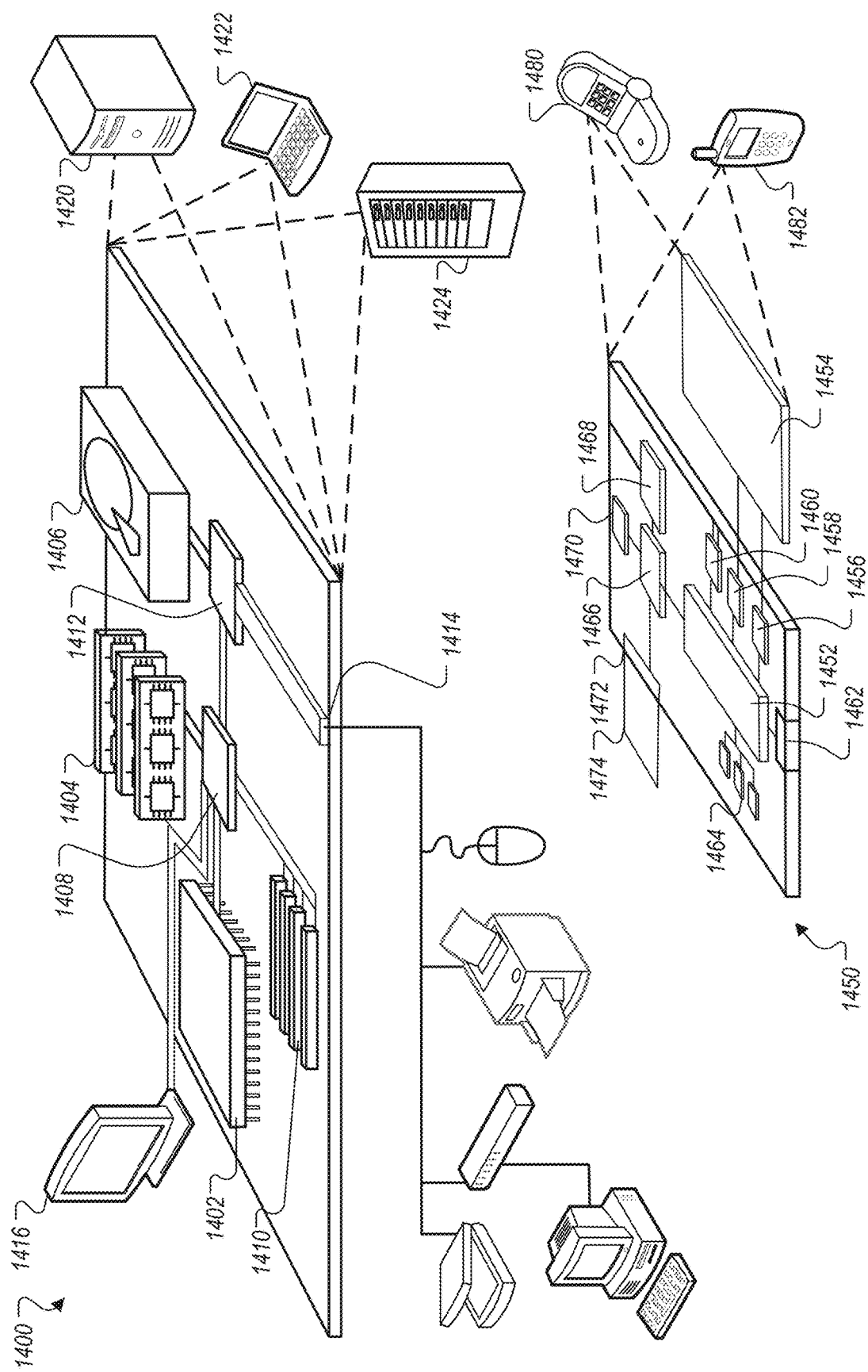
FIG. 14 is a block diagram of an example computer system that can be used to implement the methods, systems and processes described in this disclosure.

FIG. 14 is a block diagram of example computing devices 1400, 1450 that may be used to implement the systems and methods described in this document, as either a client or as a server or plurality of servers. Computing device 1400 is intended to represent various forms of digital computers, such as laptops, desktops, workstations, personal digital assistants, servers, blade servers, mainframes, and other appropriate computers. Computing device 1400 is further intended to represent any other typically non-mobile devices, such as televisions or other electronic devices with one or more processors embedded therein or attached thereto. Computing device 1450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 1400 includes a processor 1402, memory 1404, a storage device 1406, a high-speed controller 1408 connecting to memory 1404 and high-speed expansion ports 1410, and a low-speed controller 1412 connecting to low-speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high-speed controller 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a computer-readable medium. In one implementation, the memory 1404 is a volatile memory unit or units. In another implementation, the memory 1404 is a non-volatile memory unit or units.

The storage device 1406 is capable of providing mass storage for the computing device 1400. In one implementation, the storage device 1406 is a computer-readable medium. In various different implementations, the storage device 1406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1404, the storage device 1406, or memory on processor 1402.

The high-speed controller 1408 manages bandwidth-intensive operations for the computing device 1400, while the low-speed controller 1412 manages lower bandwidth-intensive operations. Such allocation of duties is an example only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed bus 1414. The low-speed bus 1414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms and/or virtualized, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as computing device 1450. Each of such devices may contain one or more of computing devices 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The computing device 1450 may also be provided with a storage device, such as a micro-drive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can process instructions for execution within the computing device 1450, including instructions stored in the memory 1464. The processor may also include separate analog and digital processors. The processor may provide, for example, for coordination of the other components of the computing device 1450, such as control of user interfaces, applications run by computing device 1450, and wireless communication by computing device 1450.

Processor 1452 may communicate with a user through control interface 1458 and display interface 1456 coupled to a display 1454. The display 1454 may be, for example, a TFT LCD display or an OLED display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of computing device 1450 with other devices. External interface 1462 may provide, for example, for wired communication (e.g., via a docking procedure) or for wireless communication (e.g., via Bluetooth® or other such technologies).

The memory 1464 stores information within the computing device 1450. In one implementation, the memory 1464 is a computer-readable medium. In one implementation, the memory 1464 is a volatile memory unit or units. In another implementation, the memory 1464 is a non-volatile memory unit or units. Expansion memory 1474 may also be provided and connected to computing device 1450 through expansion interface 1472, which may include, for example, a subscriber identification module (SIM) card interface. Such expansion memory 1474 may provide extra storage space for computing device 1450, or may also store applications or other information for computing device 1450. Specifically, expansion memory 1474 may include instructions to carry out or supplement the processes described above, and may include secure information also. Thus, for example, expansion memory 1474 may be provide as a security module for computing device 1450, and may be programmed with instructions that permit secure use of computing device 1450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452.

Computing device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 1468 (e.g., a radio-frequency transceiver). In addition, short-range communication may occur, such as using a Bluetooth®, WiFi, or other such transceiver (not shown). In addition, GPS receiver module 1470 may provide additional wireless data to computing device 1450, which may be used as appropriate by applications running on computing device 1450.

Computing device 1450 may also communicate audibly using audio codec 1460, which may receive spoken information from a user and convert it to usable digital information. Audio codec 1460 may likewise generate audible sound for a user, such as through a speaker, e.g., in a handset of computing device 1450. Such sound may include sound from voice telephone calls, may include recorded sound (e.g., voice messages, music files, etc.) and may also include sound generated by applications operating on computing device 1450.

The computing device 1450 may be implemented in a number of different forms, as shown in the figure. For example, it may be implemented as a cellular telephone 1480. It may also be implemented as part of a smartphone 1482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for using a mobile computing device as a security system component, the method comprising:
   determining, by a security system gateway, that the security system gateway is not capable of wide area network communication;
   sending a backup connection request, to a mobile device, for the mobile device to act as a wide area network backup connection for the security system gateway, wherein the backup connection request is sent to the mobile device over a local area network connection;
   receiving a response, from the mobile device, to the backup connection request, confirming that the mobile device will act as the wide area network backup connection;
   creating a message targeted for a remote security system service;
   sending the message to the mobile device with a forwarding request for the message to be sent to the remote security system service by the mobile device on behalf of the security system gateway; and
   receiving a confirmation, from the mobile device, that the message has been sent to the remote security system service, by the mobile device, on behalf of the security system gateway.

2. A method for using a mobile computing device as a security system component, the method comprising:
   determining, by a security system gateway, that the security system gateway is not capable of wide area network communication;
   sending a backup connection request, to a mobile device, for the mobile device to act as a wide area network backup connection for the security system gateway;
   receiving a response, from the mobile device, to the backup connection request, confirming that the mobile device will act as the wide area network backup connection;

creating a message targeted for a remote security system service;

sending the message to the mobile device with a forwarding request for the message to be sent to the remote security system service by the mobile device on behalf of the security system gateway; and receiving a confirmation, from the mobile device, that the message has been sent to the remote security system service, by the mobile device, on behalf of the security system gateway, wherein the mobile device sends the message over a wide area network.

3. A method for using a mobile computing device as a security system component, the method comprising:

determining, by a security system gateway, that the security system gateway is not capable of wide area network communication;

sending a backup connection request, to a mobile device, for the mobile device to act as a wide area network backup connection for the security system gateway;

receiving a response, from the mobile device, to the backup connection request, confirming that the mobile device will act as the wide area network backup connection;

creating a message targeted for a remote security system service;

sending the message to the mobile device with a forwarding request for the message to be sent to the remote security system service by the mobile device on behalf of the security system gateway;

receiving a confirmation, from the mobile device, that the message has been sent to the remote security system service, by the mobile device, on behalf of the security system gateway; and receiving, from the mobile device, a reply message that was sent to the mobile device from the remote security system service, in reply to the message.

4. The method of claim 3, wherein the reply message is sent to the mobile device over a wide area network connection.

5. The method of claim 3, wherein the reply message is received by the gateway over a local area network connection.

6. The method of claim 3, wherein the mobile device sends the message over a wide area network.

7. The method of claim 6, wherein the backup connection request is sent to the mobile device over a local area network connection.

8. The method of claim 3, wherein the backup connection request is sent to the mobile device over a local area network connection.

9. The method of claim 3, further comprising determining, by the security system gateway, that the mobile device is at the premises.

10. The method of claim 9, wherein the security system gateway determines that the mobile device is at the premises based on location information sent by the mobile device.

11. The method of claim 1, wherein the security system gateway determines that the security system gateway is not capable of wide area network communication based on one of detection of a failed attempted communication over a wide area network and detection of a condition of the security system gateway, the condition preventing communication by the security system gateway over a wide area network.

12. The method of claim 11, wherein the mobile device sends the message over the wide area network.

13. The method of claim 1, further comprising determining, by the security system gateway, that the mobile device is at the premises.

14. The method of claim 13, wherein the security system gateway determines that the mobile device is at the premises based on location information sent by the mobile device.

15. The method of claim 13, wherein the security system gateway determines that the mobile device is at the premises based on evaluating a signal strength of a signal from the mobile device.

16. The method of claim 2, wherein the security system gateway determines that the security system gateway is not capable of wide area network communication based on one of detection of a failed attempted communication over a wide area network and detection of a condition of the security system gateway, the condition preventing communication over a wide area network.

17. The method of claim 16, wherein the wide area network is a cellular communications network.

18. The method of claim 2, further comprising determining, by the security system gateway, that the mobile device is at the premises.

19. The method of claim 18, wherein the security system gateway determines that the mobile device is at the premises based on location information sent by the mobile device.

20. The method of claim 18, wherein the security system gateway determines that the mobile device is at the premises based on evaluating a signal strength of a signal from the mobile device.

* * * * *